US008828273B2

(12) United States Patent
Richardson et al.

(10) Patent No.: US 8,828,273 B2
(45) Date of Patent: Sep. 9, 2014

(54) ADDITIVE FORMULATION FOR INDUSTRIAL COOLING SYSTEMS

(75) Inventors: John Richardson, Hanover, VA (US); Dale P. Stuart, Mechanicsville, VA (US)

(73) Assignee: Chemtreat, Inc., Glen Allen, VA (US)

( * ) Notice: Subject to any disclaimer, the term of this patent is extended or adjusted under 35 U.S.C. 154(b) by 0 days.

(21) Appl. No.: 12/789,467

(22) Filed: May 28, 2010

(65) Prior Publication Data

US 2011/0293469 A1 Dec. 1, 2011

(51) Int. Cl.
*C23F 11/173* (2006.01)
*C02F 5/14* (2006.01)
*C23F 11/14* (2006.01)
*C23F 11/10* (2006.01)
*C09K 5/10* (2006.01)
*C02F 1/00* (2006.01)

(52) U.S. Cl.
CPC ............... *C23F 11/10* (2013.01); *C02F 1/008* (2013.01); *C09K 5/10* (2013.01); *C02F 2303/08* (2013.01); *C02F 2305/04* (2013.01); *C02F 5/14* (2013.01)
USPC ........... 252/390; 252/392; 252/396; 252/401; 252/403; 252/409; 252/389.23; 252/400.23; 422/7; 422/15; 422/16; 422/17

(58) Field of Classification Search
CPC ..................................................... C23F 11/04
USPC .............. 252/389.23, 390, 392, 396, 400.23, 252/401, 403, 409; 422/7, 15, 16, 17
See application file for complete search history.

(56) References Cited

U.S. PATENT DOCUMENTS

| 4,197,210 A * | 4/1980 | Bridger ........................ 508/231 |
| 4,464,276 A * | 8/1984 | Sung et al. ................... 508/279 |
| 4,642,221 A * | 2/1987 | Hansen et al. ................. 422/16 |
| 4,663,053 A * | 5/1987 | Geiger ......................... 210/699 |
| 4,847,017 A * | 7/1989 | Clubley et al. ................. 562/24 |
| 4,898,687 A * | 2/1990 | Parker et al. ............. 252/389.61 |
| 4,973,409 A * | 11/1990 | Cook ........................... 210/699 |
| 5,013,482 A * | 5/1991 | O'Neil ......................... 252/395 |
| 5,023,011 A * | 6/1991 | Busch et al. .................. 510/253 |
| 5,035,720 A * | 7/1991 | Weers ........................... 44/343 |
| 5,091,113 A * | 2/1992 | Clubley ........................ 252/396 |
| 5,120,661 A * | 6/1992 | Baker et al. ................... 436/164 |
| 5,166,074 A * | 11/1992 | Vessey et al. ................. 436/103 |
| 5,271,862 A * | 12/1993 | Freese .......................... 252/181 |
| 5,547,612 A * | 8/1996 | Austin et al. ............... 134/22.19 |
| 5,698,512 A * | 12/1997 | Austin et al. .................. 510/475 |
| 5,800,732 A * | 9/1998 | Coughlin et al. ............. 252/180 |
| 2003/0122104 A1 * | 7/2003 | Blakemore et al. ........... 252/175 |

* cited by examiner

*Primary Examiner* — Joseph D Anthony
(74) *Attorney, Agent, or Firm* — Oliff PLC

(57) ABSTRACT

Disclosed is a concentrated cooling water additive that is substantially non-corrosive within a pH range of 2-12 and contains polymeric dispersant(s) and aromatic azole(s) that exhibits improved stability, possibly as a result of the interaction of the hydrophobic groups in the dispersant polymer and the aromatic azole(s). This improved stability allows for both reduced corrosivity of the formula and reduced manufacturing costs. Benefits of the disclosed formulations include improved safety for handling and shipment, more concentrated formulations available in liquid form, reduced shipping costs and storage space, reduced heat of neutralization during product manufacture, reduced costs of manufacture due to removal of need for caustic or acid addition and reduced environmental compliance costs associated with washing and waste handling step.

28 Claims, No Drawings

ADDITIVE FORMULATION FOR INDUSTRIAL COOLING SYSTEMS

TECHNICAL FIELD

The additive compositions encompassed by the present disclosure are cooling water additive formulations providing a non-corrosive aqueous formulation with polymeric dispersants and an aromatic azole such as tolyltriazole (TT) and/or butylbenzotriazole (BBT) and/or benzotriazole (BT) useful in industrial cooling apparatuses.

Although earlier aqueous additive formulations used TT, BT and/or BBT, the solutions were generally formulated to provide an acidic (pH<2) or alkaline/caustic (pH>12) solutions to obtain sufficient solubility. TT, for example, is relatively insoluble at percentage levels below pH 12, particularly when decreasing the temperature below room temperature, a condition that is not uncommon in outside drum storage. Because additive concentrates are frequently stored in locations that are exposed to ambient conditions or, if not at ambient, may be afforded less environmental control that could result in temperatures above and/or below ambient conditions, conventional practice provided for increased pH levels, typically above pH 12 for formulations containing TT. The need for these relatively high pH levels tended to both render the resulting formulations corrosive and increase the cost of the formulation.

BACKGROUND OF THE INVENTION

The use of copper and copper alloys for heat exchange surfaces is common practice because of their improved thermal conductivity. However, these materials are susceptible to aqueous corrosion. In addition, the corrosion of copper alloys can also lead to accelerated corrosion rates throughout the entire system as the salts from the corroded heat exchangers come in contact with ferrous components creating galvanic corrosion cells.

For decades, industrial water treatment practitioners have used aromatic azoles to reduce corrosion rates experienced by copper alloys. Perhaps the most commonly used aromatic azoles available to the industrial water treatment practitioner in today's market are benzotriazole and tolyltriazole. In addition to the aromatic azoles, industrial water treatment practitioners also typically include one or more polymeric dispersants and phosphonates in the additive formulations to improve the overall performance and to keep systems running efficiently. Examples of such prior art systems and formulations may be found in, for example, U.S. Pat. Nos. 4,197,210; 4,464,276; 4,642,221; 5,035,720 and 5,800,732, the contents of which are incorporated herein, in their entirety, by reference.

The aqueous formulation of aromatic azoles at percentage levels (>1%) in a water treatment formulation typically requires that the formulation pH be either alkaline (pH>12) for tolyltriazole derivatives or acidic (pH<2) for benzotriazole derivatives. This leads to finished product formulations generally having a hazardous pH, either strongly acidic or strongly basic which then relates to increased storage and shipping requirements. The addition of acidic or basic salts used to modify pH also effectively decreases product concentration while increasing product weight. The combination of acids and bases are also associated with heat generation during product manufacture which tends to increase both costs and manufacturing cycle time. In 40 C.F.R. §261.22, the EPA defines a substance as being corrosive if "it is aqueous and has a pH less than or equal to 2 or greater than or equal to 12.5 . . . ." The U.S. Department of Transportation ("DOT") also allows the use of this definition to determine whether a substance is to be considered hazardous for transport in commerce.

Further enhancement of corrosivity classifications can be studied in regard to corrosivity towards membranes such as skin. Corrositex™ distributed by InVitro International is an in vitro test that determines chemical corrosivity and permits assignment of Packing Group classification for Class 8 corrosives. This test replaces the rabbit test of dermal corrosivity by providing a reliable means of mimicking this test. The proprietary core technology of the Corrositex™ test is based upon a biomembrane and chemical detection system, which becomes colored when exposed to potentially corrosive substances. It is highly desirable that water treatment formulations are not corrosive by both of these classification methods.

The additive compositions encompassed by the present disclosure reduce corrosivity, allow for increased concentration of actives, and reduces or eliminates the need to use either potash or caustic soda or mineral acids such as sulfuric or hydrochloric acid by providing a formulation that exhibits increased stability at significantly more moderate, i.e., non-corrosive, pH values. (pH>2-pH<12)

Further, the elimination of mineral acid or caustic soda or potash allows for improved manufacturing time intervals by reducing the time, equipment and/or energy required to dissipate the heat of neutralization.

DESCRIPTION OF PRIOR ART

Prior to the additive compositions encompassed by the present disclosure, aqueous based additives needed to have a strongly acidic or alkaline pH so the formulation would be stable at storage temperatures. For example with tolyltriazole formulations for most industrial applications utilizing ambient temperature storage, the pH of the additive solution needs to be increased to a value greater than 12 to provide sufficient stability for tolyltriazole concentrations greater than about 1.0% by mass at temperatures below room temperature.

Various attempts to address the problem of maintaining tolyltriazole in solution have been disclosed in prior U.S. patents with the various approaches adapted for the intended environment of the application.

Several patents disclose complexes between amido species or amines and aromatic azoles for fuel oil additives. U.S. Pat. No. 4,464,276, the contents of which are incorporated herein, in its entirety, by reference, discloses polyoxyalkylene polyamine-triazole complexes for use in an additive for diesel fuel oil. U.S. Pat. No. 5,035,720, the contents of which are incorporated herein, in their entirety, by reference, discloses the use of polyamines, alkoxyamines arlyoxyamines, and monoalkyleneamines to complex triazole into aoil formulations.

Additives with polyhydric species are successful in remaining stable with high concentrations of tolyltriazole at a pH around 5. U.S. Pat. No. 5,800,732, the contents of which are incorporated herein, in its entirety, by reference, discloses the formulation of all-in-one treatments at pH between 4.5 and 6.0 that contain hydrogen peroxide, hydroxyethylidenediphosphonic acid, an organic alcohol, ethylene glycol, polymeric dispersant, and a phosphated acrylate.

None of the references noted above, however, provide any teaching or suggestion regarding of the use of dispersant polymers containing hydrophobic monomers to stabilize aromatic azole containing formulations at non-corrosive pH levels achieved by the additive compositions encompassed by the present disclosure. Further, the additive compositions encompassed by the present disclosure avoid the use environmentally detrimental material such as ethylene glycol.

BRIEF SUMMARY

Disclosed are a range of aqueous additive compositions comprising at least 2 wt % of an aromatic azole in combination with a polymeric dispersant (or dispersants) although, as will be appreciated by those skilled in the art, the compositions may include a number of additional components intended to adjust the performance of the composition for the operating characteristics of a particular system. In a range of preferred compositions, relative amounts of the polymeric dispersant or, in some cases, more complex dispersant packages, and the aromatic azole will be present in a weight ratio of at least 1:1 with the resulting compositions being deemed non-corrosive, i.e., the composition exhibits a pH value of at least 2 and less than 12. As discussed in more detail below, pH values in the range of 3 to 4 can be readily achieved while maintaining a satisfactory concentration of the aromatic azole, e.g., at least 2 wt % of an appropriate aromatic azole or azole mixture.

As noted above, the aqueous additive composition can include one or more aromatic azole including, for example, tolyltriazole, butylbenzotriazole, benzotriazole and mixtures thereof. The polymeric dispersant is, in turn, formulated and/or selected to include a copolymer, terpolymer or quadpolymer that provides a sufficient level of nonionic functionality. For example, a range of polymers prepared from a combination of an allyloxybenzenesulfonic acid monomer, a methallyl sulfonic acid monomer, a copolymerizable nonionic monomer and a copolymerizable olefinically unsaturated carboxylic acid monomer would be suitable for use in formulating the additive composition and practicing the associated method(s).

Depending on the particular combination of components, non-corrosive concentrated additive solutions can be prepared to provide least 2 wt % and even more than 4 wt %, of the aromatic azole(s) in a solution that exhibits improved stability. These characteristics of the additive solution are advantageous in the manufacture, shipping, storage and use of the inventive compositions.

As noted, the basic additive concentration may be supplemented with other components in order to, for example, address scale-inducing species found within the system including, for example, silicon and alkaline earth metals, particularly calcium, that can form carbonates, oxides and other compounds that tend to foul the system, reducing flow and heat transfer efficiency. One class of compounds that can be used in this manner are calcium carbonate threshold inhibitors including, for example, phosphonobutanetricarboxilic acid, hydroxyethylidene-1,1-diphosphonic acid and mixtures thereof. As will be appreciated by those skilled in the art, a number of other compounds can be used to achieve the desired effect including, for example, compounds with reduced phosphorus.

If other components, e.g., calcium carbonate threshold inhibitors are incorporated into the additive composition their presence may be reflected in the corresponding compositional ratios. For example, a weight ratio of the polymeric dispersant and the calcium carbonate threshold inhibitor to the aromatic azole may be at least 7:1 while the weight ratio of the polymeric dispersant to the aromatic azole may be at least 4:1.

Other components including, for example, polyacrylic acid may also be incorporated into the additive composition at various ratios relative to the aromatic azole(s) in a range of compositions. Additive compositions incorporating polyacrylic acid according to the disclosure may, for example, exhibit a weight ratio of the polymeric dispersant to the aromatic azole of at least 4:1 and a weight ratio of the polymeric dispersant and polyacrylic acid to the aromatic azole of at least 7:1. Other compositions may exhibit both a weight ratio of the polymeric dispersant to the aromatic azole is at least 1:1 and a weight ratio of the polymeric dispersant and polyacrylic acid to the aromatic azole is at least 7:1, but the relative quantity of the polyacrylic acid may be increased to provide a weight ratio of the polyacrylic acid to the aromatic azole of at least 7:1 or even at least 10:1.

One or more of these additive compositions may, in turn, be used in practicing methods of suppressing the corrosion of wetted copper-containing surfaces within a circulating water system including the steps of introducing a volume of concentrated aqueous additive composition into the aqueous working liquid circulating through the water system. As detailed above, the additive composition is non-corrosive and comprises at least 2 wt % of aromatic azole(s) in combination with polymeric dispersant(s) wherein the polymeric dispersant and the aromatic azole are present in the additive composition in a weight ratio of at least 1:1 and the additive composition exhibits a pH value of at least 2 and less than 12.

As will be appreciated by those skilled in the art, a range of monitoring, control and feeding equipment and methods may be utilized for maintaining an effective amount of the additive concentration within the water system. It is anticipated that most, if not all, such methods will include measuring a concentration of a component of the additive concentration or a corresponding proportional tracer compound within the chilled water system and then adjusting a feed rate or feed period of the concentrated additive concentration to maintain the concentration of the additive component within a target concentration range during an operational period, thereby protecting wetted copper-containing surfaces and, typically, suppressing scale formation.

DETAILED DESCRIPTION OF EXAMPLE EMBODIMENTS

Preparation of a stable tolyltriazole (TT hereinafter) aqueous formulation with pH>2 and pH<12 is achieved through the use of one or more water soluble polymeric dispersants providing nonionic functionality. The polymers that may be used in this manner may be formed from two, three or four monomers to produce, corresponding copolymers, terpolymers and quadpolymers. For convenience, these polymers will be referred to collectively as "copolymers," but this usage should not be construed to limit the polymers to those produced using only two distinct monomer components. Copolymer formulations such as those disclosed in, for example, U.S. Pat. Nos. 5,698,512 and 5,547,612, the contents of which are incorporated herein in their entirety, would generally be considered suitable for use in the disclosed formulations.

To generate a more stable solution, it has been discovered the weight ratio of copolymer to TT should be at least 1:1 to generate a stable additive with up to 4.0% TT. Typically a calcium carbonate threshold inhibitor such as phosphonobutanetricarboxilic acid ("PBTC") is added as part of a dispersant package with the polymer for improved calcium carbonate scale inhibition. To generate a stable solution, it has been discovered the weight ratio of the dispersant package (copolymer+PBTC) to TT should be at least 7:1.

Optionally, a person can use hydroxyethylidene-1,1-diphosphonic acid (HEDP hereinafter) as a threshold inhibitor. HEDP offers improved corrosion resistance for ferrous materials in addition to improved threshold inhibition properties over PBTC, thereby allowing for improved scale inhibition. While maintaining the same weight ratios as the formulations with PBTC, HEDP formulations are capable of holding up to 4.2% TT in a stable additive formulation.

It may become desirable to mix PBTC with HEDP to take advantage of PBTC's resistance to halogen biocide oxidation and HEDP's superior dispersive and corrosion properties. Formulations using weight ratio of 4:1:1 for the copolymer: HEDP:PBTC have been stable with up to 2.0% TT.

Removing the PBTC and/or HEDP in the dispersant package and replacing them with 25% more polyacrylic acid ("PAA") while maintaining a copolymer to TT ratio of 4 and generating a total dispersant package to TT weight ratio of 7 allows for stable formulations containing up to 5.5% TT. Further increasing the PAA ratio at the expense of copolymer in such a way as to decrease the copolymer to TT ratio to 1, while increasing the PAA ratio to 10.25 decreases the amount of TT that can remain stable in solution to 4.0% for most ambient storage conditions.

Substitution of copolymers with hydrophobic groups with an acrylamidomethylpropylsulfonate-acrylic acid copolymer ("AA/AMPS") resulted in unstable formulations with large quantities of TT flocculating out of solution. A formulation attempt to hold 3.0% TT in solution was unsuccessful with the following ratios dispersant to TT: 9.6 AA/AMPS, 4.8 PAA, 14.4 total dispersant package.

To generate a stable aqueous additive formulation, once TT is added to the dispersant package (copolymer, PAA, PBTC and/or HEDP), the blend is stirred vigorously for 30 minutes to solubilize the TT. In the first 5 minutes, the TT flocculating out of solution slowly turns to small white particles. With 25 additional minutes of vigorous stirring, the white particles become fully dispersed in such a way that the formulation appears clear.

EXAMPLE 1

Preparation of a blend using copolymer, PBTC, TT, and p-toluenesulfonic acid monohydrate (PTSA) would be as follows. To weight needed, add 68 weight % water. While mixing, add 20.0% copolymer (40%), 8.0% PBTC (50%); and 4.0% tolyltriazole (50%) sodium salt. Mix the formulation for another 10 minutes before adding 0.5% PTSA (10%) solution and then continuing mixing the formulation for an additional 20 minutes. The pH of this formulation was found to be 3.6 and was been observed to remain stable for over 30 days at temperatures ranging from 35° F. to 110° F. (2° C. to 43° C.).

EXAMPLE 2

Preparation of a blend using copolymer, PBTC, HEDP, TT, and PTSA would be as follows. To weight needed, add 67.7% water. While mixing, add 20% copolymer (40%), 4.0% PBTC; 3.3% HEDP (60%); and 4% tolyltriazole (50%) sodium salt. Mix the formulation for 10 minutes before adding 1.0% PTSA (10%) solution and then continue to mix blend for an additional 20 minutes. The formulation has a pH of 3.0 and has been observed to be stable for over 30 days at temperatures ranging from 35° F. to 110° F. (2° C. to 43° C.).

EXAMPLE 3

Prepare non-phosphorous blend with high concentration of copolymer by adding copolymer (40%) to tank. To weight wanted and while mixing, add 33% polyacrylic acid (50%) and 8% PBTC (50%). After 10 minutes of additional mixing, add 1.4% PTSA (10%.) Continue mixing blend for 20 additional minutes. This has been observed to be stable for over 30 days at temperatures ranging from 35° F. to 110° F. (2° C. to 43° C.).

EXAMPLE 4

Preparation of a blend using copolymer, PBTC, TT, and PTSA would be as follows. To weight needed, add 35.0% water. While mixing, add 40% copolymer (40%), 16% PBTC (50%); and 8% tolyltriazole (50%) sodium salt. Mix the blend for 10 minutes before adding 1.0% of PTSA (10%) solution. Continue mixing the blend for an additional 20 minutes after PTSA addition. The pH of this formulation is 3.1 and has been observed to be stable for over 30 days at temperatures ranging from 35° F. to 110° F. (2° C. to 43° C.).

EXAMPLE 5

Prepare non-phosphorous blend with a copolymer:TT ratio of 1:1 by adding 82% polyacrylic acid (50%) of the weight needed to the mix tank. While mixing, add 10% copolymer (40%) and 8% tolyltriazole (50%) sodium salt. After 10 minutes of additional mixing, add 1.4% PTSA (10%.) Continue mixing blend for 20 additional minutes. This formulation has a pH of 3.2 and has been observed to be stable for over 30 days at temperatures ranging from 35° F. to 110° F. (2° C. to 43° C.).

A number of commercially available products that may be used in practicing the disclosed invention including, for example, BAYHIBIT AM 50, a 50% solution of 2-phosphonobutane-1,2,4-tricarboxylic acid (CAS Reg. No. 37971-36-1); AQUATREAT AR-540, a copolymer of acrylic acid and sulfonated monomers in which the sulfonated monomers combine hydrophobic character, aromatic structure and high charge density to provide multifunctional performance characteristics; and WINTROL T-50, an aqueous solution of 50% sodium TT salt. Utilizing the disclosure provided above, those skilled in the art will have no difficulty identifying other suitable and readily available compositions and components for practicing the disclosed invention.

One skilled in the art will appreciate various modifications can be made to the teachings of the present disclosure without departing from the intended spirit and scope thereof. It is intended that the inventions disclosed herein be limited only by the terms of the appended claims.

We claim:

1. An aqueous additive composition comprising:
at least 2 wt % of an aromatic azole; and
a polymeric dispersant including at least one hydrophobic monomer;
the polymeric dispersant and the aromatic azole being present in a weight ratio of at least 1:1, wherein the composition exhibits a pH value of at least 2 and less than 12.

2. The aqueous additive composition of claim 1, wherein:
the aromatic azole is selected from a group consisting of tolyltriazole, butylbenzotriazole, benzotriazole and mixtures thereof.

3. The aqueous additive composition of claim 1, wherein:
the polymeric dispersant provides a nonionic functionality.

4. The aqueous additive composition of claim 3, wherein:
the polymeric dispersant is prepared from an allyloxybenzenesulfonic acid monomer, a methallyl sulfonic acid monomer, a copolymerizable nonionic monomer, and a copolymerizable olefinically unsaturated carboxylic acid monomer.

5. The aqueous additive composition of claim 1, wherein: the composition comprises at least 4 wt % of the aromatic azole.

6. The aqueous additive composition of claim 1, further comprising:
a calcium carbonate threshold inhibitor.

7. The aqueous additive composition of claim 6, wherein: the calcium carbonate threshold inhibitor is selected from a group consisting of phosphonobutanetricarboxilic acid, hydroxyethylidene-1,1-diphosphonic acid and mixtures thereof.

8. The aqueous additive composition of claim 6, wherein: a weight ratio of the polymeric dispersant and the calcium carbonate threshold inhibitor to the aromatic azole is least 7:1.

9. The aqueous additive composition of claim 6, wherein: a weight ratio of the polymeric dispersant to the aromatic azole is at least 4:1.

10. The aqueous additive composition of claim 1, further comprising:
polyacrylic acid.

11. The aqueous additive composition of claim 10, wherein:
a weight ratio of the polymeric dispersant to the aromatic azole is at least 4:1.

12. The aqueous additive composition of claim 10, wherein:
a weight ratio of the polymeric dispersant and polyacrylic acid to the aromatic azole is at least 7:1.

13. The aqueous additive composition of claim 10, wherein:
a weight ratio of the polymeric dispersant to the aromatic azole is at least 1:1 and a weight ratio of the polymeric dispersant and polyacrylic acid to the aromatic azole is at least 7:1.

14. The aqueous additive composition of claim 13, wherein:
a weight ratio of the polyacrylic acid to the aromatic azole is at least 7:1.

15. The aqueous additive composition of claim 13, wherein:
a weight ratio of the polyacrylic acid to the aromatic azole is at least 10:1.

16. A storage stable aqueous additive composition comprising:
at least 2 wt % of an aromatic triazole; and
a polymeric dispersant including at least one hydrophobic monomer;
wherein the polymeric dispersant and the aromatic azole are present in a weight ratio of at least 1:1; and
further wherein the composition exhibits a pH value of at least 2 and less than 12.

17. The storage stable aqueous additive composition according to claim 16, wherein:
the aromatic azole is tolyltriazole; and
a polymeric dispersant is selected from a group of dispersants including those comprising copolymers prepared from acrylic acid and sulfonated monomers; copolymers prepared from an allyloxybenzenesulfonic acid monomer, a methallyl sulfonic acid monomer, a copolymerizable nonionic monomer, and a copolymerizable olefinically unsaturated carboxylic acid monomer and mixtures thereof.

18. An aqueous additive composition consisting essentially of:
at least 2 wt % of an aromatic azole;
an additional species selected from a group consisting of calcium carbonate threshold inhibitors, polyacrylic acid and mixtures thereof; and
a polymeric dispersant including at least one hydrophobic monomer;
the polymeric dispersant and the aromatic azole being present in a weight ratio of at least 1:1, wherein the composition exhibits a pH value of at least 2 and less than 12.

19. The aqueous additive composition of claim 1, wherein: the composition exhibits a pH value of about 2 to about 4.

20. The aqueous additive composition of claim 1, wherein: the composition exhibits a pH value of 2 to 3.6.

21. The aqueous additive composition of claim 1, wherein: the composition exhibits a pH value of 3 to 3.6.

22. The aqueous additive composition of claim 1, wherein: the polymeric dispersant is a copolymer.

23. The aqueous additive composition of claim 1, wherein: the polymeric dispersant is a terpolymer.

24. The aqueous additive composition of claim 1, wherein: the polymeric dispersant is a quadpolymer.

25. The aqueous additive composition of claim 1, wherein: the polymeric dispersant includes a sulfonated monomer.

26. The aqueous additive composition of claim 25, wherein:
the sulfonated monomer has a hydrophobic character.

27. The aqueous additive composition of claim 26, wherein:
the sulfonated monomer has an aromatic structure.

28. The aqueous additive composition of claim 25, wherein:
the polymeric dispersant further includes an acrylic acid.

* * * * *